(12) United States Patent  (10) Patent No.: US 7,281,704 B2
Salice  (45) Date of Patent: Oct. 16, 2007

(54) DAMPING APPARATUS FOR MOVING FURNITURE PARTS

(75) Inventor: Luciano Salice, Carimate (IT)

(73) Assignee: Arturo Salice S.p.A., Novedrate (Como) (IT)

( * ) Notice: Subject to any disclaimer, the term of this patent is extended or adjusted under 35 U.S.C. 154(b) by 80 days.

(21) Appl. No.: 10/402,183

(22) Filed: Mar. 28, 2003

(65) Prior Publication Data

US 2003/0213663 A1 Nov. 20, 2003

(30) Foreign Application Priority Data

Mar. 28, 2002 (DE) ............................ 202 04 986 U

(51) Int. Cl.
 *F16F 9/18* (2006.01)
(52) U.S. Cl. .................. 267/124; 267/70; 267/226; 267/64.26; 267/64.27; 188/297
(58) Field of Classification Search ................ 267/70, 267/121, 124, 221, 226, 34, 195, 64.25, 64.26; 16/82, 84, 85; 188/281, 288, 297, 322.22
See application file for complete search history.

(56) References Cited

U.S. PATENT DOCUMENTS

| 2,881,467 | A | | 4/1959 | Struhar | |
|---|---|---|---|---|---|
| 3,171,643 | A | * | 3/1965 | Roos | ........................ 267/64.15 |
| 4,974,285 | A | | 12/1990 | Enrietti | |
| 4,999,873 | A | | 3/1991 | Lisak | |
| 5,157,806 | A | * | 10/1992 | Wartian | ........................ 16/66 |
| 5,220,706 | A | * | 6/1993 | Bivens | ........................ 16/66 |
| 5,535,514 | A | | 7/1996 | Lucas | |
| 5,702,091 | A | * | 12/1997 | Perrin et al. | ............. 267/64.12 |
| 6,615,450 | B2 | * | 9/2003 | Salice | ........................ 16/85 |

FOREIGN PATENT DOCUMENTS

| AT | 0004911 | 12/2001 |
|---|---|---|
| DE | 2006773 | 8/1971 |
| DE | 2443643 | 4/1976 |
| DE | 3729597 | 3/1989 |
| DE | 4212079 | 10/1993 |
| DE | 4319641 | 12/1993 |
| DE | 4409716 | 9/1995 |
| DE | 20117031 | 1/2002 |
| DE | 20120112 | 2/2002 |
| FR | 2267439 | 11/1975 |
| JP | 0020279886 | 11/1990 |
| JP | 06272447 | 9/1994 |

* cited by examiner

*Primary Examiner*—Bradley King
(74) *Attorney, Agent, or Firm*—Dilworth & Barrese LLP.

(57) ABSTRACT

The present invention relates to a damping apparatus for moving furniture parts, for example doors, flaps or drawers. Such a damping apparatus of a compact construction which avoids a possible springing back movement of the furniture parts is provided in accordance with the invention in that the damping apparatus has at least two damping stages each having a cylinder having a piston longitudinally displaceable therein which exert a damping action of different strengths.

22 Claims, 2 Drawing Sheets

DAMPING APPARATUS FOR MOVING FURNITURE PARTS

BACKGROUND OF THE INVENTION

The present invention relates to a damping apparatus for moving furniture parts, for example for doors, flaps or drawers.

Such damping apparatuses are known in numerous different embodiments. DE 44 09 716 A1 shows an air damper which consists of a piston and a cylinder and whose piston is braked on its plunging into the cylinder by the compressed air in the cylinder, with the escape of the air being largely prevented by a seal through which the piston is moved on plunging into the cylinder. DE 37 29 597 A1 likewise shows a damping apparatus comprising a cylinder and a piston longitudinally displaceably received therein. A spigot is received in the cylinder which has a diameter changing in the longitudinal direction and which is guided in the piston designed as a hollow piston. The air compressed in the cylinder on the insertion of the piston is expanded depending on the position of the piston by the annular gap between the spigot and the bore of the piston.

Damping apparatuses of the kind first mentioned are furthermore known from DE 201 20 112.7. Air dampers are disclosed which have a bore in the jacket wall of the cylinder close to the closed end region, whereby a very good damping effect can be achieved.

If furniture parts are closed with great force or at great speed, the kinetic energy cannot be completely absorbed immediately by the aforesaid dampers on contact with them so that it can occur that the furniture parts jump back before they are pulled into their final closed position by closing apparatuses. A door damping element is known from JP 0020279886 AA which consists of a resilient damping part and an oil damper. The resilient damping part should have the effect that the impact of the door is damped. The remaining kinetic energy should be absorbed by the oil damper.

SUMMARY OF THE INVENTION

It is the object of the present invention to provide a damping apparatus of the kind first mentioned which avoids a possible jumping back movement of the furniture parts with a compact construction.

The object is solved by a damping apparatus having the features herein. In accordance with the invention, the damping apparatus has at least two damping stages which have in each case a cylinder having a piston longitudinally displaceable therein and which exert a damping effect of different strength. The braking effect is thus divided into two stages which are designed differently in that they exert braking effects of different strengths on their actuation. Provision can, for example, be made that the braking effect is achieved by two damping stages of which the first damping stage has a comparatively weak spring and the second damping stage has a customary air damper. In such an embodiment, the movement of the furniture part is initially mainly reduced by the force of the spring, while the following damping stage is only partly made use of. The remaining kinetic energy already reduced by the first stage is then completely absorbed by the second damping stage. A progressive braking effect thus results between the two stages, whereby jumping back of the furniture parts is avoided.

The damping apparatus can consist of two damping stages. More than two damping stages can naturally also be realized. The design of the damping apparatus with telescopic cylinders results in a particularly compact aspect of the damping apparatus.

In a preferred aspect of the present invention, the damping apparatus has a multistage, preferably two-stage, telescopic cylinder whose first damping stage has a piston loaded by a spring and received in a telescopic cylinder and whose second damping stage is formed by an air damper. The design of a damping apparatus with multi-stage telescopic cylinders is known, for example, from the already named DE 201 20 112.7 and also from DE 201 17 031.0. Damping apparatuses of this kind are characterized by a very small length or installation depth such that a particularly compact construction can be realized.

An air gap can exist between the piston and the cylinder of the first damping stage such that the braking effect of the first damping stage is essentially brought about by the force of the spring acting on the piston.

In a further aspect of the present invention, provision is made that the cylinder of the first damping stage has a piston fixedly connected to it which has a peripheral seal received in a groove which contacts the wall of the cylinder of the following damping stage in the insertion direction in a sealing manner and which contacts the groove wall in the moving out direction.

Whereas a compression of the air in the cylinder space thus takes place on the insertion movement, and thus the desired damping effect of the air damper is achieved, air can pass between the piston and the cylinder wall on the moving out so that the piston can be moved outward freely and easily.

The sealing is advantageously received in a groove of the piston which is in communication with the inner space of the cylinder of the following damping stage via passages. On the moving out of the piston, air flows through the passages such that, as described above, the piston can be pulled freely outward.

Provision can further be made that the piston of the first damping stage and the piston of the second damping stage each have a cut-out in Which the end regions of the spring of the fist damping stage are received.

In a further aspect of the invention, provision is made that the cylinder of the first damping stage has an annular flange by means of which this is supported in the starting position at a collar of the cylinder of the second damping stage at the front face.

The cylinder of the first damping stage can have an annular flange at which the piston of the first damping stage is supported in the starting position.

In a preferred aspect of the present invention, the last, or in a two-stage design the second, damping stage is formed by an air damper whose cylinder has a bore close to the closed end region in the jacket wall, the diameter of said bore being substantially smaller than that of the cylinder. Reference is made here to DE 201 20 112.7, from which a damping apparatus having a correspondingly arranged bore can be seen.

In a further aspect of the present invention, provision is made that the piston of the first damping stage has a plunger in whose end region a magnet is arranged. This has the effect that the damping apparatus is again moved into its starting position on the opening of the moving furniture part and is then available for a new damping process.

Provision can further be made for a spring to be provided in the last damping stage which is supported on the base of the cylinder of the last damping stage and exerts a return force on the piston of this damping stage. This spring guides the piston of this damping stage back into its starting position.

Provision can be made in this case that the piston of the first damping stage has a plunger in whose end region a buffer is arranged.

It is particularly advantageous for the first damping stage to exert a lower damping action than the second damping stage. Provision can be made for the second damping stage to be designed such that its starting friction is overcome during the actuation of the first damping stage. A gentle transition of the braking effect of the damping stages can thereby be achieved, whereby a springing back of the furniture parts can largely be avoided.

BRIEF DESCRIPTION OF THE DRAWINGS

Further details and advantages of the present invention will be explained in more detail with reference to an embodiment shown in the drawing, in which are shown.

DESCRIPTION OF THE PREFERRED EMBODIMENTS

Figure 1:
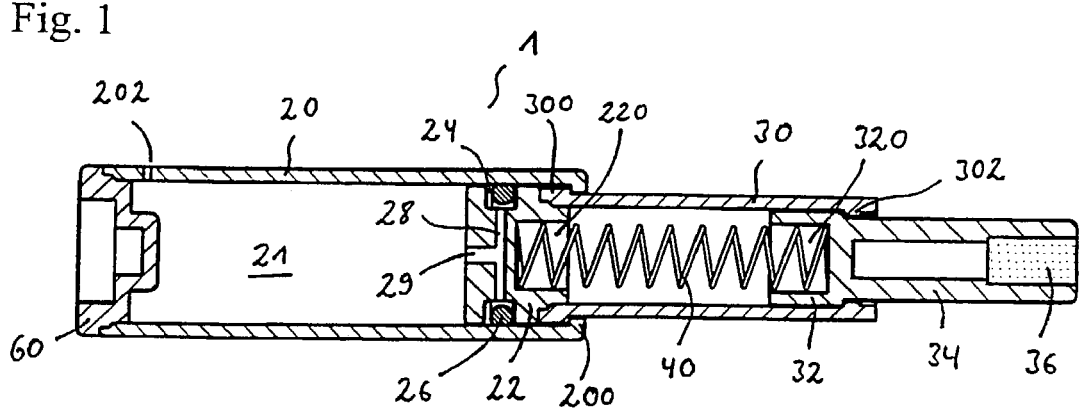
FIG. 1: a sectional representation through a first embodiment of the damping apparatus in accordance with the invention in its starting position.

A damping apparatus 1 in accordance with the invention can be seen from FIG. 1. This consists of two damping stages of which the first has the cylinder 30 having the piston 32 and the second has the cylinder 20 having the piston 22.

The piston 32 is guided in a longitudinally displaceable manner in the cylinder 30 of the first damping stage. The piston 32 has a plunger 34 in one piece with it in whose end region the magnet 36 is arranged.

The cylinder 30 has in its end region the piston 22 of the second damping stage, said piston 22 being fixedly connected to said cylinder 30. The connection can take place, for example, by ultrasonic welding.

The piston 22 is displaceably guided in the cylinder 20 of the second damping stage.

The piston 32 has the cut-out 320 an the piston 22 has the cut-out 220 in which the end regions of the spring 40 of the first damping stage are received.

The piston 32 is supported in its starting position shown in FIG. 1 at the annular collar 302 of the cylinder 30. Furthermore, the cylinder 30 is supported in the starting position by its annular flange 300 at the collar 200 of the cylinder 20 at the front face, as is shown in FIG. 1.

The piston 32 is guided in the cylinder 30 such that an air gap remains between the piston 32 and the inner cylinder wall through which the air can flow such that the movement of the piston 32 substantially only takes place against the force of the spring 40 such that the damping characteristic of this first damping stage is quite substantially determined by the spring 40.

The piston 22 of the second damping stage has the annular groove 24 in which the seal 26 is received. The groove 24 is in communication with the inner space 21 of the cylinder 20 of the second damping stage by means of the passages 28 and 29.

The end region of the cylinder 20 is closed by the cap 60 which is fixedly connected to the cylinder 20, for example by ultrasonic welding or by other customary means. The bore 202, through which air escapes in a controlled manner on the pressing of the piston 22 into the cylinder 20, whereby the damping action of the second damping stage is effected, is located in the end region of the jacket surfaces of the cylinder 20.

Figure 2:
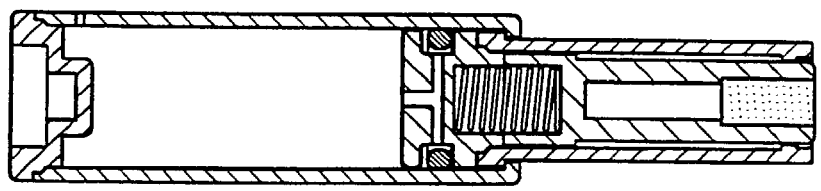
FIGS. 2, 3: a section through the damping apparatus in accordance with FIG. 1 in a partially and fully inserted position.
Figure 3:
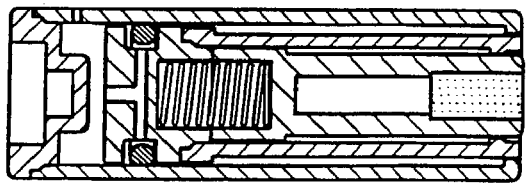

The function of the damping apparatus shown in FIG. 1 is designed as follows: on the pressing in of the plunger 34, the spring 40 is first compressed which sets a lower resistance against the impressing force than the second damping stage formed by the air damper. This has the consequence that the piston 32 is moved in the direction of the piston 22 until the end faces of the pistons contact one another, as is shown in FIG. 2. Part of the movement of the furniture part is absorbed by the pushing in of the piston 32 and the movement energy is reduced accordingly. This is now subsequently taken up by the second damping stage whose function is designed as follows:

Starting from the position shown in FIG. 2, the cylinder 30 with the piston 22 is now inserted into the cylinder 20. The air is then compressed in the inner space 21, whereby the pressure also increases in the passages 28 and 29 as well as in the groove 24 such that the seal 26 is pressed onto the inner wall of the cylinder 20. This has the consequence that the air can substantially only escape through the bore 202. The counter force applied by the air results in a further damping of the movement of the furniture part until the cylinder 30 is completely received in the cylinder 20, as is shown in FIG. 3.

The damping action of the second damping stage is advantageously designed such that the partial load also acting on the second damping stage during the compression of the spring 40 results in an overcoming of the starting friction. This has the advantage that the second damping stage is set in motion directly after the state shown in FIG. 2 so that a progressive effect of the damping apparatus is achieved and any springing back of the furniture parts can be avoided.

Figure 4:
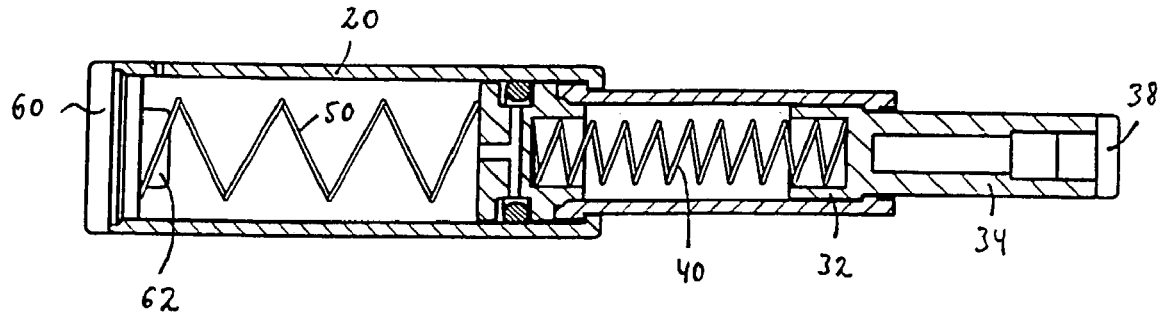
FIG. 4: a section through a further embodiment of the damping apparatus in accordance with the invention in its starting position.

FIG. 4 shows a further embodiment of the damping apparatus in accordance with the invention. The elements shown here substantially correspond to those shown in FIG. 1. An exception to this is formed by the spring 50 which is supported between the base 60 of the cylinder 20 and the area of the piston 22 of the second damping stage at the front face which faces this. The spring 50 is fixed on the neck 62 of the base 60. The spring 50 has the effect that a return force is exerted on the piston 22 such that this is pushed back into the position shown in FIG. 4 when no strain is present. The same applies accordingly to the action of the spring 40 on the piston 32.

In the embodiment shown in FIG. 4, the end region of the plunger 34 is not fitted with a magnet, but with the buffer 38.

Figure 5:
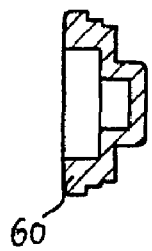
FIGS. 5-9: individual parts of the damping apparatus in accordance with FIGS. 1 to 4.

FIGS. 5 to 9 show individual parts of the aforesaid damping apparatuses in accordance with the present invention. FIG. 5 shows the base 60 of the cylinder 20 which is preferably fixedly connected to this in an air tight manner by ultrasonic welding or also by other connection techniques in order to ensure that the air only escapes through the bore 202.

Figure 6:
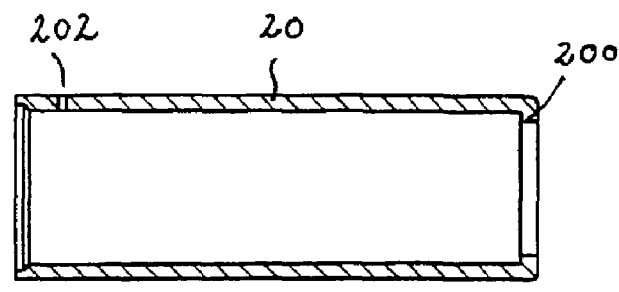

FIG. 6 shows the cylinder 20 of the second damping stage with a bore 202 and the collar 200 at the front face which, in the starting position shown in FIG. 1 and in FIG. 4, holds the annular flange 300 of the cylinder 30.

Figure 7:
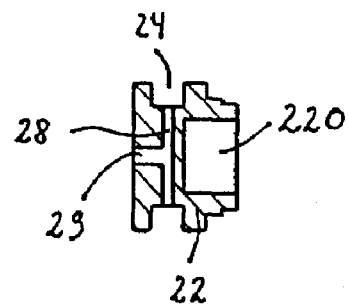

FIG. 7 shows the piston 22 with the annular groove 24 and the passages 28, 29, with the passages 28 extending radially and the passage 29 extending axially with respect to the cylinder 20 or piston 22. Furthermore the cut-out 220 can be seen in FIG. 7 which serves the purpose of taking up an end region of the spring 40 whose other end region is received in the cut-out 320 of the piston 32.

Figure 8:
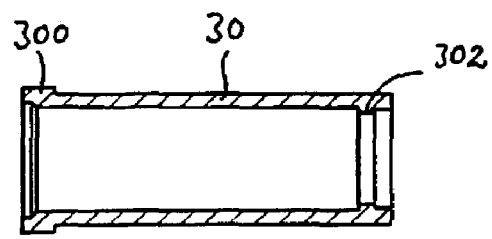

FIG. 8 shows the telescopic cylinder 30 which is received in the cylinder 20 in the inserted state of the damping apparatus, as can be seen from FIG. 3. The cylinder 30 has the annular flange 300 which contacts the collar 200 of the cylinder 20 at the front face in the starting position. Furthermore, the cylinder 30 has the annular collar 302 which serves the purpose of holding the piston 32 in the starting position in accordance with FIGS. 1 and 4.

Figure 9:
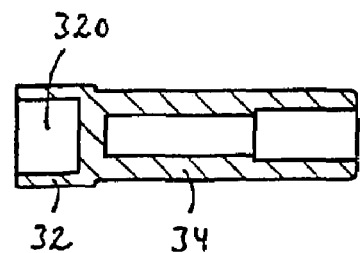

Finally, FIG. 9 shows the piston 32 with the plunger 34 adjoining it in one piece. The cut-out 320 serves the reception of an end region of the spring 40; the cut-out of the plunger 34 shown on the right hand side serves the reception of a magnet 36 (see FIG. 1) or of the buffer 38 (see FIG. 4).

The present embodiments show the second damping stage as an air damper and the first damping stage as a spring-loaded damper. Generally, other embodiments are also conceivable here. For example, the air damper could also be formed by another customary damping device.

The invention claimed is:

1. A damping apparatus for moving furniture parts, wherein
   the damping apparatus (1) has at least a first and second damping stage, said first damping stage having a cylinder (30) and a piston (32) longitudinally displaceable therein,
   said second damping stage having a cylinder (20) and a piston (22) longitudinally displaceable therein,
   first means (40) arranged for exerting a damping action on said piston (32) of said first damping stage,
   second means (202, 50) arranged for exerting a damping action on said piston (22) of said second damping stage,
   the first damping stage has the piston (32) of the first damping stage loaded by a spring (40) and received in the cylinder (30) of the first damping stage which is telescopic and the second damping stage is formed by an air damper, and
   an air gap exists between the piston (32) and cylinder (30) of the first damping stage, such that braking effect of the first damping stage is substantially brought about by force of the spring (40) acting on the piston (32).

2. A damping apparatus in accordance with claim 1, wherein the cylinder (30) of the first damping stage is fixedly connected to the piston (22) of the second damping stage,
   a peripheral seal (26) is received in a groove (24) of the second damping stage and sealingly contacts a wall of the cylinder (20) of the second damping stage in the insertion direction and the groove wall in the moving out direction.

3. A damping apparatus (1) for moving furniture parts, wherein
   the damping apparatus (1) has at least a first and second damping stage,
   said first damping stage having a cylinder (30) and a piston (32) longitudinally displaceable therein,
   said second damping stage having a cylinder (20) and a piston (22) longitudinally displaceable therein,
   the cylinder (30) of said first damping stage and said piston (22) of said second damping stage being fixedly connected together to move as a unit,
   first means (40) arranged for exerting a damping action on said piston (32) of said first damping stage only with respect to said piston (22) of said second damping stage, and
   second means (202, 50) arranged for exerting a damping action on said piston (22) of said second damping stage only with respect to said cylinder (20) of said second damping stage, and
   the piston (32) of the first damping stage and the piston (22) of the second damping stage each have a cut-out (220, 320) in which end regions of a spring (40) of the first damping stage are received,
   such that damping action of different strengths are exerted upon said pistons (22, 32) of said respective damping stages.

4. A damping apparatus (1) for moving furniture parts, wherein
   the damping apparatus (1) has at least a first and second damping stage,
   said first damping stage having a cylinder (30) and a piston (32) longitudinally displaceable therein,
   said second damping stage having a cylinder (20) and a piston (22) longitudinally displaceable therein,
   the cylinder (30) of said first damping stage and said piston (22) of said second damping stage being fixedly connected together to move as a unit,
   first means (40) arranged for exerting a damping action on said piston (32) of said first damping stage only with respect to said piston (22) of said second damping stage, and
   second means (202, 50) arranged for exerting a damping action on said piston (22) of said second damping stage only with respect to said cylinder (20) of said second damping stage,
   said cylinders (20, 30) together form a telescopically-extending cylinder (20, 30), with an inner concentric cylinder (30) constituting part of a first damping stage and an outer concentric cylinder (20) constituting part of a second damping stage, and
   a spring (40) is mounted within said inner concentric cylinder (30) between said movable pistons (22, 32),
   such that damping action of different strengths are exerted upon said pistons (22, 32) of said respective damping stages.

5. A damping apparatus (1) for moving furniture parts, wherein
   the damping apparatus (1) has at least a first and second damping stage,
   said first damping stage having a cylinder (30) and a piston (32) longitudinally displaceable therein,
   said second damping stage having a cylinder (20) and a piston (22) longitudinally displaceable therein,
   the cylinder (30) of said first damping stage and said piston (22) of said second damping stage being fixedly connected together to move as a unit,
   first means (40) arranged for exerting a damping action on said piston (32) of said first damping stage only with respect to said piston (22) of said second damping stage, and
   second means (202, 50) arranged for exerting a damping action on said piston (22) of said second damping stage only with respect to said cylinder (20) of said second damping stage, and said first damping means is constituted by a spring (40) having one end terminating against said piston (32) of said first damping stage and an opposite end terminating against said piston (22) of said second damping stages, such that damping action of different strengths are exerted upon said pistons (22, 32) of said respective damping stages.

6. A damping apparatus in accordance with claim 5, wherein two damping stages are provided.

7. A damping apparatus in accordance with claim 5, wherein the second damping stage is formed by an air damper.

8. A damping apparatus in accordance with claim 5, wherein
- the cylinder (30) of the first damping stage is fixedly connected to the piston (22) of the second damping stage,
- a peripheral seal (26) is received in a groove (24) of the second damping stage piston (22) and sealingly contacts a wall of the cylinder (20) of the second damping stage in the insertion direction and the groove wall in the moving out direction.

9. A damping apparatus in accordance with claim 8, wherein the groove (24) of the piston (22) of the second damping stage is in communication with an inner space (21) of the cylinder (20) of the second damping stage via passages (28, 29) through the second stage damping piston (22).

10. A damping apparatus in accordance with claim 5, wherein the cylinder (30) of the first damping stage has an annular flange (300) supported, in starting position, at a collar (200) of the cylinder (20) of the second damping stage at a front face of the second damping stage cylinder (20).

11. A damping apparatus in accordance with claim 5, wherein the cylinder (30) of the first damping stage has an annular collar (302) at which the piston (32) of the first damping stage is supported in starting position.

12. A damping apparatus in accordance with claim 5, wherein a final one of said damping stages is formed by an air damper whose cylinder (20) has a bore (202) close to a closed end region in a jacket wall thereof, diameter of said bore being substantially smaller than diameter of the final damping stage cylinder (20).

13. A damping apparatus in accordance with claim 5, wherein the piston (32) of the first damping stage has a plunger (34) in turn having a magnet (36) arranged in an end region thereof.

14. A damping apparatus in accordance with claim 5, wherein a spring (50) is provided in a final one of said damping stages and exerts a return force on the piston (22) of the final damping stage.

15. A damping apparatus in accordance with claim 14, wherein the piston (32) of the first damping stage has a plunger (34) in whose end region a buffer (38) is arranged.

16. A damping apparatus in accordance with claim 5, wherein the first damping stage exerts a lower damping action than the second damping stage.

17. A damping apparatus in accordance with claim 16, wherein the second damping stage is structured and arranged such that starting friction of the second damping stage is overcome during actuation of the first damping stage.

18. A damping apparatus in accordance with claim 6, wherein
- the cylinder (30) of the first damping stage is fixedly connected to the piston (22) of the second damping stage,
- a peripheral seal (26) is received in a groove (24) of the second damping stage piston (22) and sealingly contacts a wall of the cylinder (20) of the second damping stage in the insertion direction and the groove wall in the moving out direction.

19. A damping apparatus in accordance with claim 7, wherein
- the cylinder (30) of the first damping stage is fixedly connected to the piston (22) of the second damping stage, a peripheral seal (26) is received in a groove (24) of the second damping stage piston (22) and sealingly contacts a wall of the cylinder (20) of the second damping stage in the insertion direction and the groove wall in the moving out direction.

20. A damping apparatus in accordance with claim 6, wherein the piston (32) of the first damping stage and the piston (22) of the second damping stage each have a cut-out (220,320) in which end regions of the spring (40) of the first damping stage are received.

21. A damping apparatus in accordance with claim 5, wherein said damping means in said second damping stage cylinder (20) are constituted by a bore (202) positioned through said outer cylinder (20) to control air escaping from an interior (21) of the second stage cylinder (20) upon damping.

22. A damping apparatus in accordance with claim 5, wherein said damping means in said second stage cylinder (20) are constituted by a spring (50) mounted within an interior (21) of the second stage cylinder (20) between a base (60) of the second stage cylinder (20) and the piston (22) forming part of the second damping stage.

* * * * *